United States Patent
De Angeli

(10) Patent No.: US 11,118,942 B2
(45) Date of Patent: Sep. 14, 2021

(54) AUTOMATED READER FOR GAUGE-BASED METERS

(71) Applicant: Flex Ltd., Singapore (SG)

(72) Inventor: Marco De Angeli, Barzana (IT)

(73) Assignee: Flex Ltd., Singapore (SG)

( * ) Notice: Subject to any disclaimer, the term of this patent is extended or adjusted under 35 U.S.C. 154(b) by 99 days.

(21) Appl. No.: 16/411,535

(22) Filed: May 14, 2019

(65) Prior Publication Data

US 2020/0064162 A1 Feb. 27, 2020

Related U.S. Application Data

(60) Provisional application No. 62/720,464, filed on Aug. 21, 2018.

(51) Int. Cl.
*G01D 5/34* (2006.01)
*G08C 17/02* (2006.01)
*G08B 21/18* (2006.01)

(52) U.S. Cl.
CPC ........... *G01D 5/34* (2013.01); *G08B 21/182* (2013.01); *G08C 17/02* (2013.01)

(58) Field of Classification Search
CPC ......... G01D 5/34; G08B 21/182; G08C 17/02
See application file for complete search history.

(56) References Cited

U.S. PATENT DOCUMENTS

| | | | |
|---|---|---|---|
| 2003/0193405 A1* | 10/2003 | Hunt | G01D 4/004 340/870.02 |
| 2008/0218164 A1* | 9/2008 | Sanderford | G01D 4/008 324/260 |
| 2012/0099090 A1* | 4/2012 | Berggren | G03F 7/70408 355/53 |
| 2013/0307694 A1* | 11/2013 | Amar | G01D 4/002 340/637 |
| 2018/0052234 A1* | 2/2018 | Upton | G01S 17/89 |
| 2019/0271567 A1* | 9/2019 | Van Velthoven | G01D 4/008 |

* cited by examiner

*Primary Examiner* — Amine Benlagsir
(74) *Attorney, Agent, or Firm* — Sheridan Ross P.C.

(57) ABSTRACT

Mechanical gauges remain a common means to present values of a system or system component to a user. Connecting mechanical gauges to allow for notification messages to be generated, when the value indicated by a needle of the gauge is of particular interest, provides for greater usability. Illuminating a narrow portion of a gauge and utilizing a light detector to determine if the needle is, or is not, reflecting the light emitted, allows for systems to be alerted when the gauge has a particular value. Additionally, the area of interest may be further divided and illuminated by differentiated light to allow the notification to further include the direction from which the needle has entered the area of interest.

20 Claims, 9 Drawing Sheets

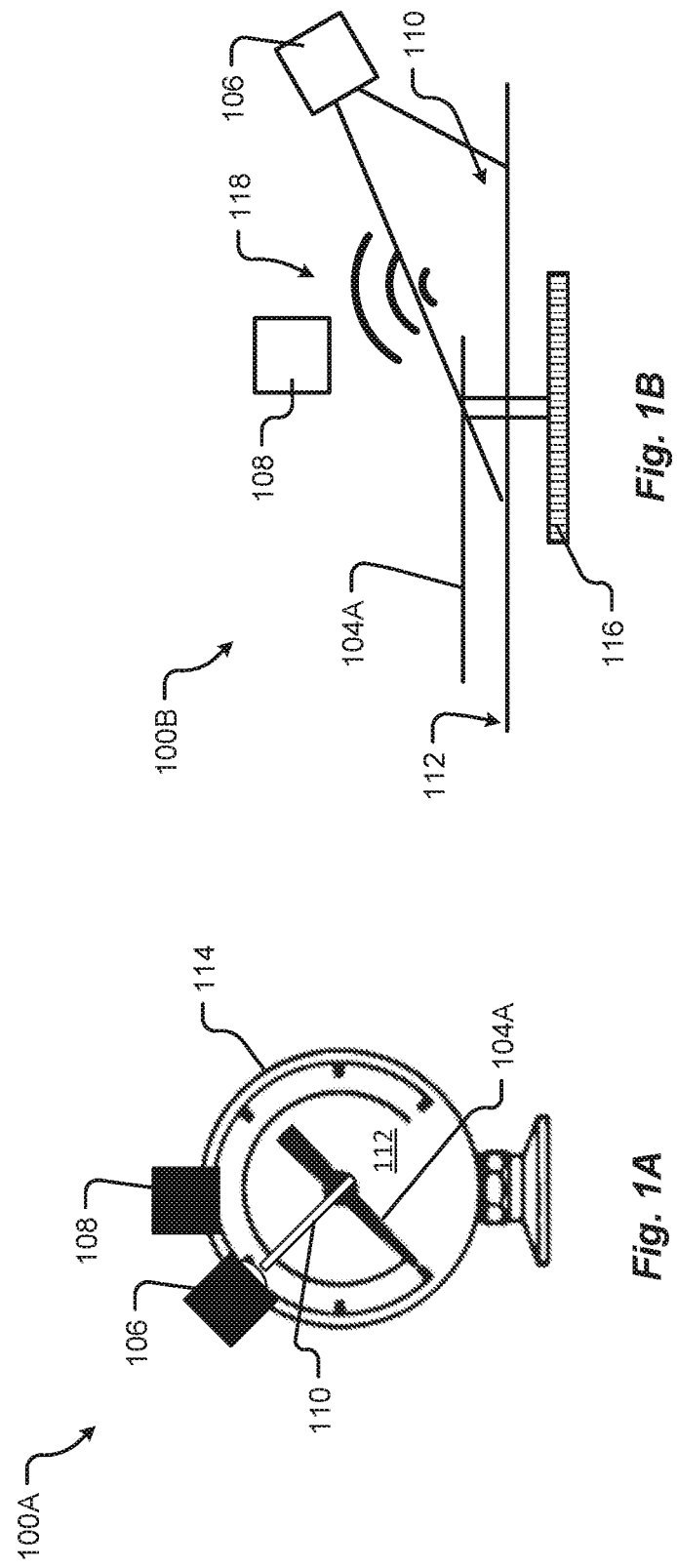

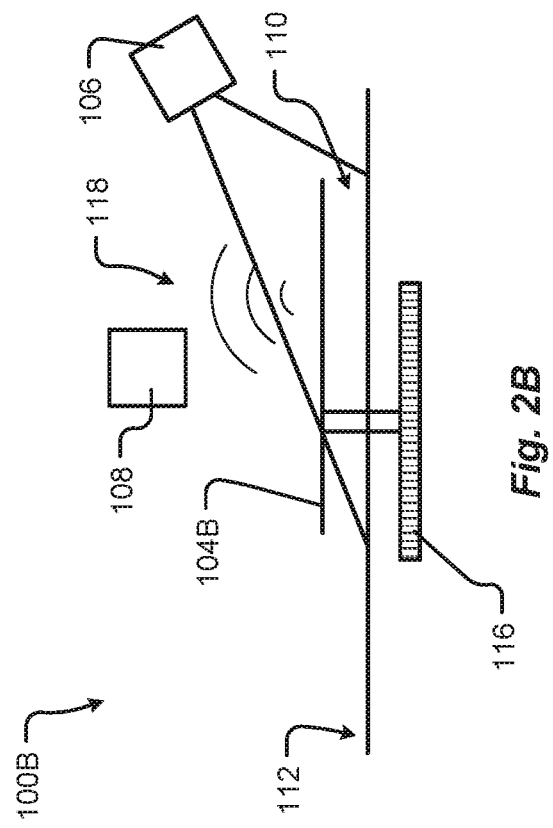
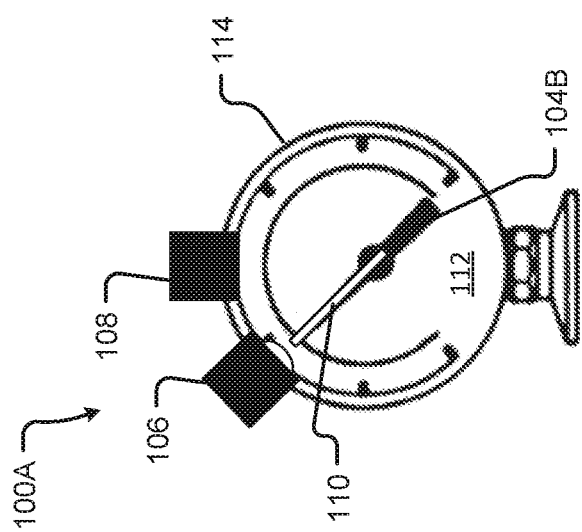

AUTOMATED READER FOR GAUGE-BASED METERS

CROSS REFERENCE TO RELATED APPLICATION

The present application claims the benefits of and priority, under 35 U.S.C. § 119(e), to U.S. Provisional Application No. 62/720,464, filed on Aug. 21, 2018, entitled "Automated Reader for Gauge-Based Meters," of which the entire disclosure is incorporated herein by reference for all that it teaches and all purposes.

FIELD OF THE DISCLOSURE

The present invention is related generally to electronically reading mechanical gauges and processing the results therefrom.

BACKGROUND

The emerging Internet-of-Things (IoT) market is demanding simple and efficient ways to collect information automatically from processes, equipment, facilities where there are already some sensors in place that were not designed to support analog or digital electrical interfaces to extract the data. One category of devices are mechanical gauges, such as those used to monitor temperature, pressure, liquid level, humidity, etc. and present their output in the form of the position of a physical needle generally as measured against a graduated background or foreground, such as a dial.

Prior art solutions exist utilizing CMOS cameras and a processing system to read the position of the needle on the dial and convert the captured image into a message to be sent to a data processing "cloud" for processing. These systems, while reliable, are complex to install, setup, train, and operate. Additionally, some gauges are used to check if the measured variable is above or below a certain threshold value and, when not at or beyond the threshold, the current position is not of interest, which may unnecessarily utilize resources performing unwanted data acquisition and processing.

SUMMARY

Mechanical gauges are a common device for measuring dynamic values in a system. A physical needle is rotated or slid against a graduated background, such as a dial. Mechanical gauges may be utilized as a legacy device or in applications where electronic meters are not suitable or practical. Often knowing if a particular value has been obtained, as presented on a gauge, is important to maintain the system being monitored.

Being able to determine if a threshold value has been obtained, especially if access to the gauge is difficult, such as due to distance, position, obscuration from a large number of other gauges being utilized, etc. Additionally or alternatively, gauges may operate for an extended period of time with no exceptional readings presented, which may cause complacency in checking such gauges, particularly if effort required to read the gauge is non-trivial.

A mechanical gauge may be improved by adding a light emitter, to emit a beam at a threshold position, and a light detector, to detect the presence of the needle in the target position, and outputting an alert when the light detector indicates the presence of the needle in the target position. The alerting component may be local, such as a light or message display on or proximate to the gauge, or remote, such as by conveying an alerting message over a communications network to a receiving and/or responding component.

Embodiments disclosed herein are generally directed to reading a black needle, that is one that has a high degree of absorption of the light emitted by the light emitter(s). The dial of the gauge having a low degree of absorption. Accordingly, the needle may be detected when the absorbed light level drops associated with the needle entering the target position and thereby absorbing more light. In another embodiment, the needle may be white and the card may black, wherein the needle may be detected when the absorbed light level increases and is associated with the needle entering the target position and thereby reflecting more light. Furthermore, while white and black are utilized herein, in other embodiments, other colors may be utilized having sufficient contrast to enable the light detected by the light detector to determine when the needle is present, versus when the needle is absent, from the target area. Furthermore, in another embodiment, "white" refers to a surface having higher degree of reflectivity of the light type (e.g., wavelength, polarization, etc.) emitted by the light emitter(s) and/or detected by the light detector, as compared to "black," which refers to a surface having lower degree of reflectivity of the light of the light type emitted by the light emitter(s) and/or detected by the light detector. The embodiments herein are generally directed towards rotational "dial" gauges; however, and in another embodiment, the subject gauge may be linear (e.g., tape-type), without departing from the scope of the embodiments described herein.

BRIEF DESCRIPTION OF THE DRAWINGS

The present disclosure is described in conjunction with the appended figures:

FIGS. 1A-1B illustrate a first depiction of a gauge system in accordance with embodiments of the present disclosure;

FIGS. 2A-2B illustrate a second depiction of a gauge system in accordance with embodiments of the present disclosure;

DETAILED DESCRIPTION

Figure 3:
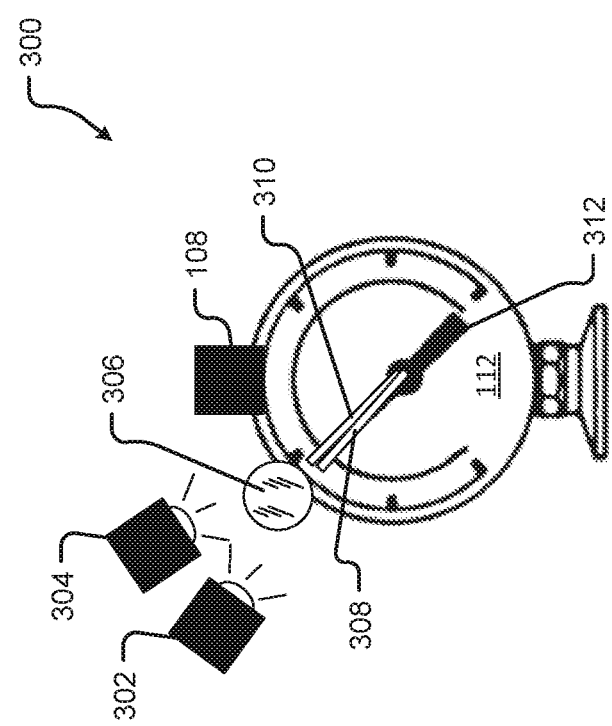
FIG. 3 illustrates a second gauge system in accordance with embodiments of the present disclosure.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

In accordance with at least one embodiment of the present disclosure, systems and methods are provided for electronic reading and processing analog inputs, such as mechanical gauges utilizing optical light diffusion.

In one embodiment, a solution to threshold checking is provided utilizing optical light diffusion. As a benefit, focusing optics may be omitted from the light detecting sensor and may be made with cost effective photo diodes.

In another embodiment, a measuring system is disclosed comprised of a light emitting subsystem that focuses the light into a planar beam. The beam is sent to the white dial of the gauge with an orientation and position selected by the user at installation. Some light is scattered back to the system and collected by photodiodes.

When the needle of the gauge reaches the predefined position, it will intercept the light rays and they will not be diffused back, such as due to a black needle absorbing light and the dial being white to reflect light.

In another embodiment, a processing system (e.g., microprocessor, server, "cloud", etc.) makes the light source blink, such that ambient light may be observed and the effects of the ambient light then subtracted from the observations that are illuminated with the light source.

In one embodiment, a device comprised of at least:

A: A light source which emits energy and is controlled by an electronics system in such a way as to facilitate a determination of observed light when illuminated, in part, by the light source and, in part, by ambient light;

B: A focusing set of elements to narrow the beam of the light source into a planar shape (e.g., casting a thin line);

C: One or more light sensors, such as photodiodes, sensitive to the wavelength of the casted light, in proximity of the output port in such a way to receive scattered light from a target (e.g., a gauge or portion thereof).

In another embodiment, and in accordance with the disclosure herein, a device wherein the light source is a LED or laser diode, in visible or invisible wavelength range (IR, UV).

In another embodiment, and in accordance with the disclosure herein, a device wherein the focusing element is made with a cylindrical lens.

In another embodiment, and in accordance with the disclosure herein, a device wherein the photodiodes are integrated into a silicon processing core that provides a digital output.

In another embodiment, and in accordance with the disclosure herein, a device wherein the electronic processing system is activating the light source and collecting the measurement from the photodiodes, applying different power levels and computes the total quantity of received scattered back light.

In another embodiment, and in accordance with the disclosure herein, a processing system that checks the computed received light and compares it with a predefined threshold, generating an alarm if the threshold is crossed.

In another embodiment, and in accordance with the disclosure herein, a processing system that uses two channels with two photodiodes, to detect if the needle is approaching a location, such as a predetermined target position, from the top of the scale or the bottom of the scale.

A product that is installed onto a gauge meter, or in close proximity, with a predefined orientation.

In another embodiment, and in accordance with the disclosure herein, a product that will detect when the needle is approaching or matching a predefined position on the dial of the gauge.

In another embodiment, and in accordance with the disclosure herein, a product that is connected to a remote system via a communications network or portion thereof and communicates the position of the needle to at least one component connected to the network.

A gauge has a needle and a target position for which alerting (e.g., newly entered the target position) or reporting (e.g., newly entered and/or remaining within the target position) is desired. In one embodiment, the target position is limited to the width of the needle, or less, on a selected portion of the gauge of the dial. As a result, the alert reports when the needle is within the target position, the target position may be limited to an area less than, or not greater that, the width of the needle. In another embodiment, the target position may be wider than the needle such as to give a range for which reporting is to be initiated or, if already initiated, maintained. As will be described herein, two light emitters may illuminate a first and second portion of the target position. As a benefit, reports or alerts may be provided to indicate: the needle is outside of the target position, the needle is within the target position, the needle is on the margin of the target position on the side of the first portion of the target position (i.e., one of rising or falling), and/or the needle is on the margin of the target position on the side of the second portion of the target position (i.e., the other of rising or falling).

FIGS. 1A-1B illustrate gauge systems 100A and 100B, in a first configuration, in accordance with embodiments of the present disclosure. In one embodiment, gauge system 100A illustrates gauge 114 in a front view and gauge system 100B illustrates gauge 114 in a side view. Gauge 114 comprises dial 112 and needle 104. Needle 104A is in a first position outside of beam 110 coinciding with a target area. Needle 104 then measures the desired value via mechanical and/or electrical connectivity to the subject being measured (not shown). Needle 104 itself is rotated to display the value of the subject via needle positioning components 116, which may comprise gears, actuators, floats, diaphragms, etc.

In another embodiment, light emitter 106 illuminates a target position with beam 110. Beam 110 is constrained to minimize or eliminate the beam 110 striking dial 112 when fully present in the target area and/or to omit striking needle 104 when not in the target position. Light detector 108 detects light, at least including, light emitted from light emitter 106. Light detector 108 detects detected light 118, which is greatest when beam 110 strikes dial 112, being white while needle 104A is outside beam 110.

FIGS. 2A-2B illustrate gauge systems 100A and 100B, in a second configuration, in accordance with embodiments of the present disclosure. In one embodiment, gauge system 100A illustrates gauge 114 in a front view and gauge system 100B illustrates gauge 114 in a side view. Gauge 114 comprises dial 112 and needle 104. Needle 104B is in a second position inside of beam 110 coinciding with a target area.

In another embodiment, light emitter 106 illuminates a target position with beam 110. Beam 110 is constrained to minimize or eliminate the beam 110 striking dial 112 when fully present in the target area and/or to omit striking needle 104 when not in the target position. Light detector 108 detects light, at least including, light emitted from light emitter 106. Light detector 108 detects detected light 118, which is decreased when beam 110 strikes needle 104B, being black. Light detector 108 then reports the drop in detected light as an alert or signal indicating needle 104B is in the target position. Light detector 108 may continually report the presence of some light as needle 104B may not be a perfect absorber of beam 110 as well as the presence of other reflective surfaces, such as components of needle positioning components 116, a cover (not shown) on gauge 114, oil filler (not shown) of gauge 114, etc. Accordingly, the differential of light detected by light detector 108 from needle 104A versus needle 104B may be reported as needle 104 being within, or not within, the target position respectively.

FIG. 3 illustrates gauge system 300 in accordance with embodiments of the present disclosure. In one embodiment, gauge system 300 comprises first light emitter 302 and second light emitter 304 each illuminating first beam 308 and second beam 310, respectively. However, it should be noted that when lens 306 is utilized, second light emitter 304 may illuminate first beam 308 and first light emitter 302 illuminates second beam 310. First beam 308 illuminates a first portion of the target position whereas second beam 310 illuminates the second portion of the target area.

When needle 312 approaches the target position by turning clockwise, commonly indicating a low value that is increasing, first beam 308, which is in a first portion of the target area, is intercepted by needle 312 which absorb at least a portion of first beam 308. Light detector 108 then detects a drop in reflected light from first beam 308. Similarly, when needle 312 approaches the target position by turning counter-clockwise, commonly indicating a high value that is decreasing, second beam 310 is in a second position of the target area, is intercepted by needle 312 which absorbs at least a portion of second beam 310.

Light detector 108 may detect light differentiated from that emitted by first light emitter 302 versus second light emitter 304. For example, light detector 108 may be sensitive to a red light, emitted from first light emitter 302 and blue light, emitted from second light emitter 304. Accordingly, if the level of red light drops, needle 312 may be reported as entering the target area from the direction of first beam 308, a low but rising direction. Similarly, if the level of blue light drops, needle 312 may be reported as entering the target area from the direction of second beam 310, a high but decreasing direction. If both red and blue light have dropped, needle 312 may be reported as within the target position.

The light from first light emitter 302 and second light emitter 304 may be differentiated based on wavelength, as illustrated above, and/or other attribute. For example, by on-off duty cycle or polarization. When an on-off duty cycle is utilized, one of first light emitter 302 or second light emitter 304 is energized at any one time. Continuing the example, if light detector 108 detects a decrease in light when first light emitter 302 is energized versus a baseline (needle 312 is outside of the target area) value, then needle 312 may be reported as entering the target position from the direction of first beam 308 (low but rising). Similarly, if the level of X-axis polarized light drops, which is provided by second light emitter 304, then needle 312 may be reported as entering the target position from the direction of second beam 310 (high but decreasing). Additionally or alternatively, light emitted by one or more of light emitter 106, first light emitter 302, or second light emitter 304 may not be visible to the unaided human eye (e.g., infrared, ultraviolet, etc.).

It should be appreciated that if lens 306 is utilized, beams may cross therein and first beam 308, as illustrated, may be illuminated by second light emitter 304 and second beam 310 is illuminated, also as illustrated, from first light emitter 302. Therefore, deployment of lens 306 may further entail switching the directional identifiers to correctly indicate the direction needle 312 was approaching the target position.

Lens 306 may be utilized with a single light emitter 106, as illustrated by gauge system 100 in FIGS. 1A and 2A, or in a multiple light emitter embodiment, such as that illustrated by gauge system 300 having first light emitter 302 and second light emitter 304. Lens 306 may be a cylindrical lens such that light emitted from light emitter 106, first light emitter 302, and/or second light emitter 304 produces an elongated beam when co-planar with dial 112 and/or needle 312. For example, light entering the side (convex) facet of lens 306, exits in an elongated beam and may be focused into a needle-like rectangular beam that may define a target area, for a single light emitter, or a portion of a target area, when utilized with multiple light emitters. It should be appreciated that beam focusing may be provided by other means, including the use of columnated light emitters (lasers), shutters, mirrors, and/or other light focusing, shuttering, and/or collimating means.

Figure 4:
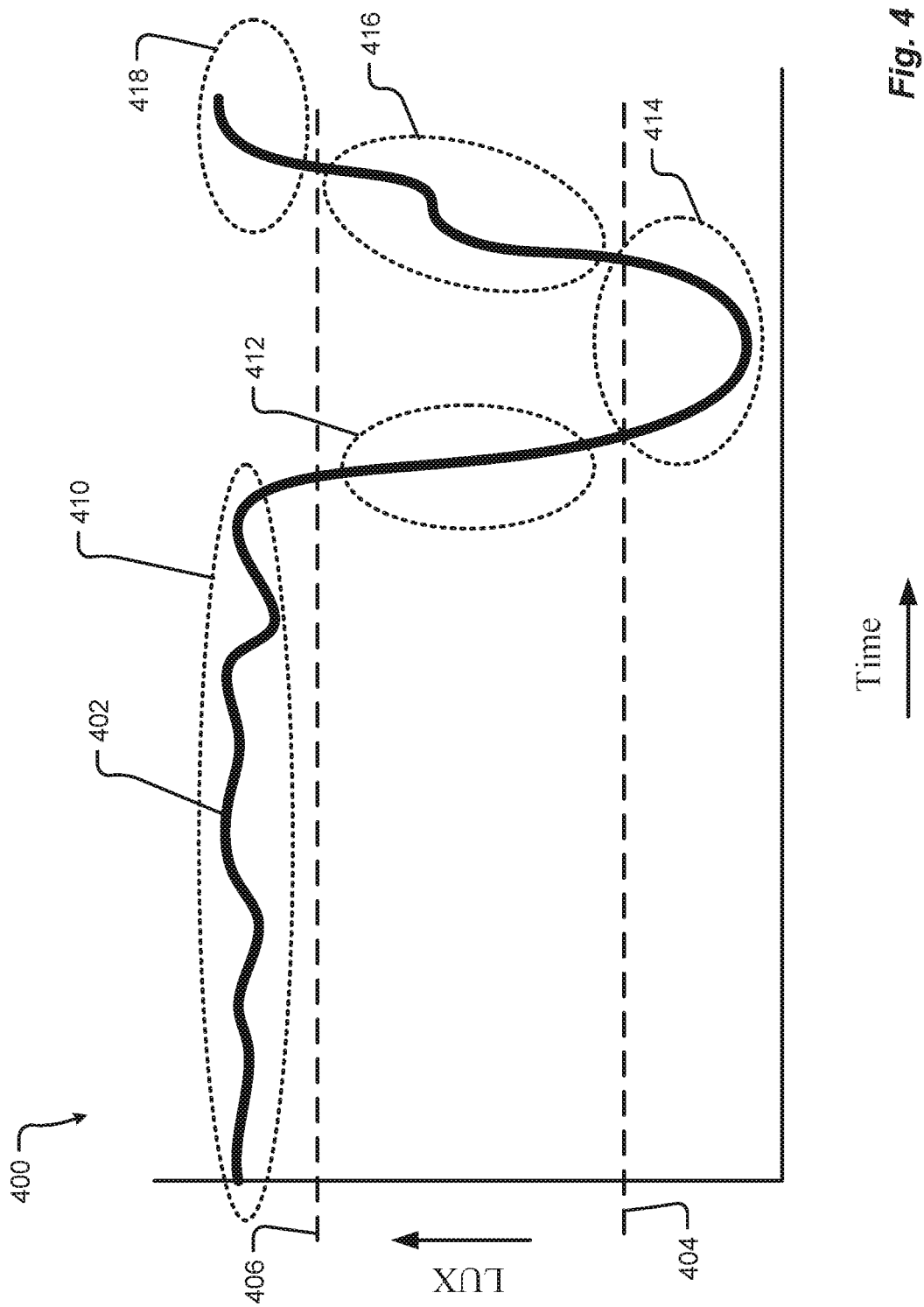
FIG. 4 illustrate a first light detection graph in accordance with embodiments of the present disclosure.

FIG. 4 illustrate light detection graph 400 in accordance with embodiments of the present disclosure. In one embodiment, curve 402 illustrates an output signal from light detector 108 when deployed to monitor light reflecting from gauge 114 and, more specifically, needle 104 and/or dial 112 (see, FIGS. 1A-1B and 2A-2B). It should be appreciated that, in other embodiments, digital signals or message packets may be the output from light detector 108 and utilized to convey the data, or indicia thereof, illustrated by curve 402.

In one embodiment, curve 402 is divided into three areas, a first area bounded by a low, or zero, light value and low-threshold 404, a second area bounded by low-threshold 404 and high-threshold 406, and a third area above high-threshold 406. When curve 402 is within the first area, such as curve portion 414, light levels are low, such as indicating the presence of needle 104 within the target position. Light levels above high-threshold 406, such as those of curve portion 410 and 418, may indicate light is not being absorbed by needle 104, such as when beam 110 is striking dial 112 and reflecting increased light. Curve portions 412, 416 may be indeterminate and may be utilized to preserve the most recent state. For example, curve portion 412 had a most recent state associated with needle 104 not being within the target position, indicated by curve portion 410. Accordingly, curve portion 412 may maintain such status. Curve portion 416 had a most recent state associated with needle 104 being within the target position, indicated by curve portion 414. Accordingly, curve portion 416 may maintain such status. Additionally or alternatively, curve portions 412 and 416 may be ignored. In a further embodiment, no middle values may be utilized, such as any portion of curve 402 below high-threshold 406 may be utilized to indicate the presence of needle 104 within the target position. Additionally or alternatively, any portion of curve 402 above low-threshold 404 may indicate the absence of needle 104 from the target position.

Figure 5:
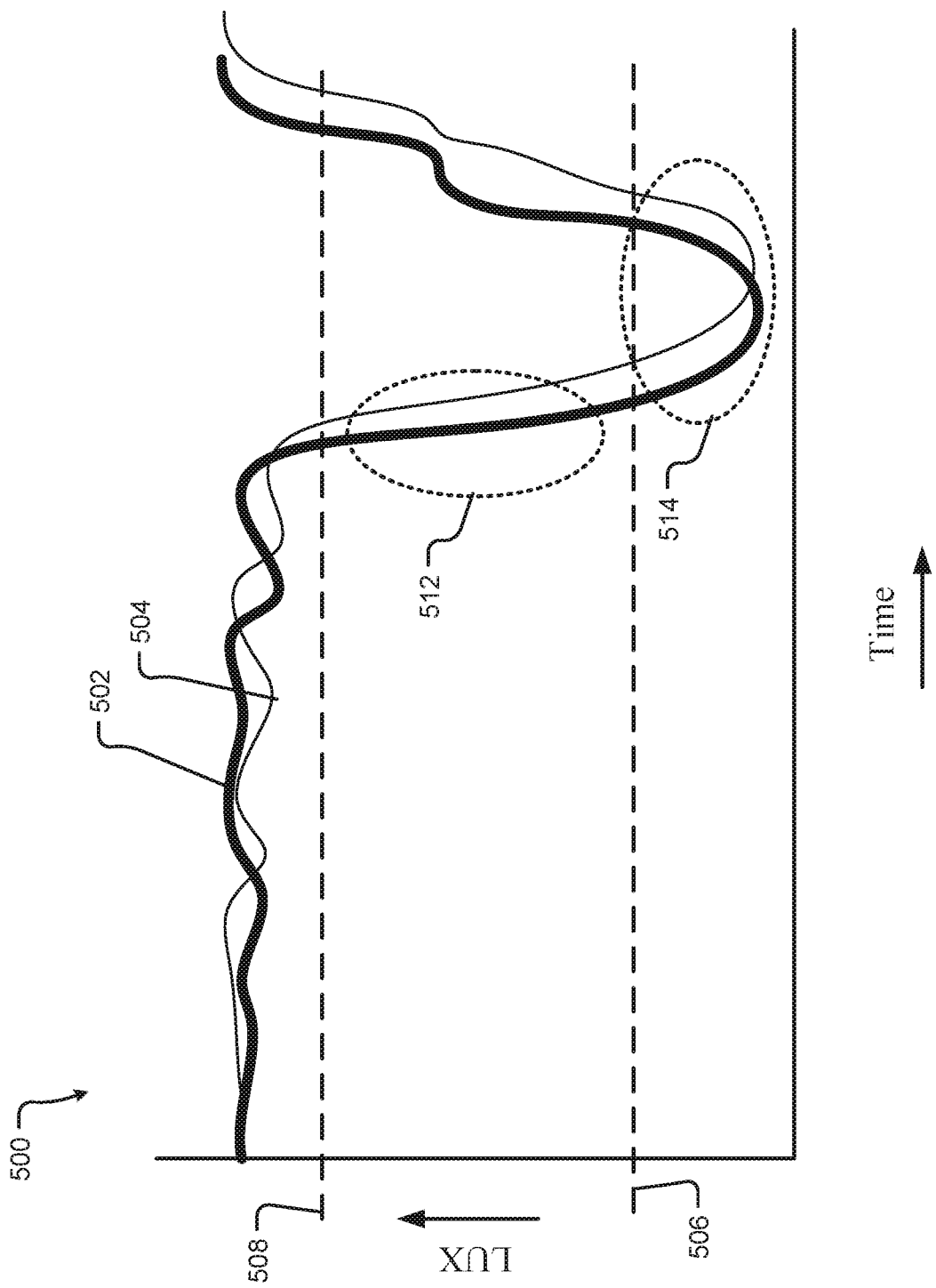
FIG. 5 illustrate a second light detection graph in accordance with embodiments of the present disclosure.

FIG. 5 illustrate light detection graph 500 in accordance with embodiments of the present disclosure. In one embodiment, graph 500 is associated with differentiated light, such as from first light emitter 302 and second light emitter 304 (see, FIG. 3). In one embodiment, differentiated light is detected and reported as curve 502 and curve 504. Light detector 108 may be configured to detect, and output a signal associated with, each of the detected lights. Additionally or alternative, light detector 108 may comprise two discrete light detectors, each sensitive to one of the differentiated types of light (e.g., color, polarization). As will be described in more detail with respect to FIG. 5, light detector 108 may detect the on-off state of light differentiated due to the cycle of alternating powering of one light emitter of a pair, such as first light emitter 302 and second light emitter 304.

Similar to FIG. 4, a portion below low-threshold 506 may be associated with needle 104 being within the target position and absorbing light. The area above high-threshold 508 may be associated with base reflectivity, such as when needle 104 is outside of the target area and the light observed is not reflected from needle 104. The area between high-threshold 508 and low-threshold 512 may be utilized to maintain a prior state or ignored wherein high-threshold 508 and low-threshold 506 are the same and values above, indicate absence of needle 104 in the target position and values below indicate the presence of needle 104 in the target position.

The occurrence of curve 502 within curve portion 514 prior (more left) to curve 504 entering curve portion 514 may indicate that the direction of needle 104 is entering the target position from the direction of the beam associated with curve 502. Additionally or alternatively, curve 502 being prior (more left) to curve 504 within curve portion 512 may be utilized to indicate entry of needle 104 from the direction associated with light producing curve 502.

Figure 6:
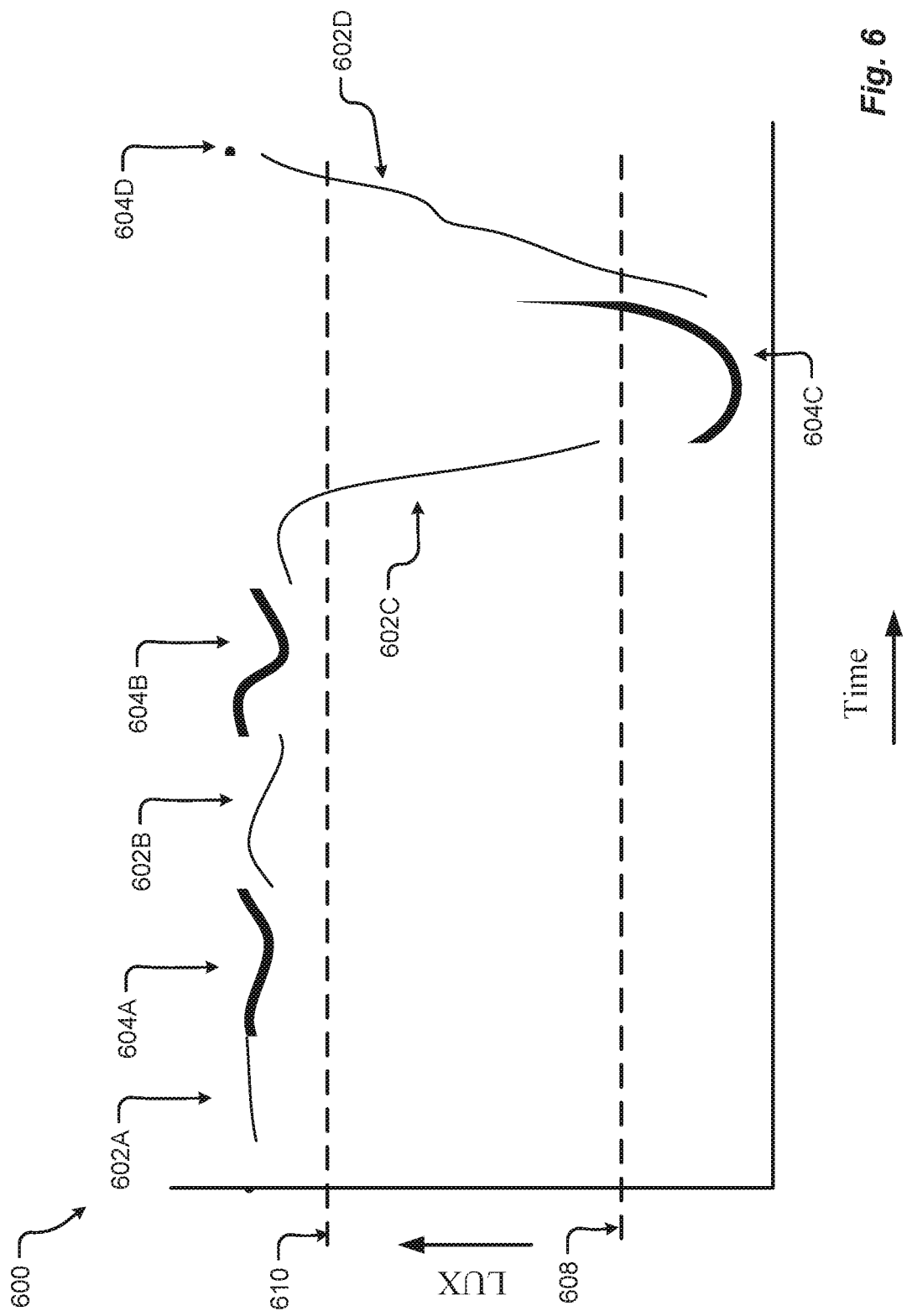
FIG. 6 illustrate a third light detection graph in accordance with embodiments of the present disclosure.

FIG. 6 illustrate light detection graph 600 in accordance with embodiments of the present disclosure. In one embodiment, two light emitters, such as first light emitter 302 and second light emitter 304 are utilized, each producing light that is differentiated from the other by on-off cycle state. Curve 602 comprises a number of curve portions 602A, 602B, and 602C and curve 604 comprises a number of curve portions 604A, 604B, 604C, and 604D, such as may be detected by light detector 108 detecting light as first light emitter 302 and second light emitter 304 are alternatively powered on and off. The light producing curves 602 and 604 may be the same type of light, for example, having the same wavelength, except for the timing of the when a particular light emitter 302 or 304 is powered on. As a benefit, light detector 108 may avoid the need to discriminate light that is differentiated by other types (e.g., wavelength and polarization).

In one embodiment, curve portion 604C is below low-threshold 608 and therefore indicates that needle 312 is within the target position. Additionally, the light detected by light detector 108 is associated with curve 604. Accordingly, only one of light emitters 302, 304 namely the one energized during the time curve portion 604C is observed therefore, needle 312 may be determined to be within the target position and/or approaching the target position from the direction of the beam associated with light curve 604.

Similar to FIG. 5, the portion between high-threshold 610 and low-threshold 608 may be utilized to maintain a prior observation or, alternatively, omitted. For example, curve 602 is neither above high-threshold 610 nor below the low-threshold 608. This may be considered indeterminate or maintenance of the last observation, such as curve portion 604B indicating needle 312 is outside the target position. Additionally or alternatively, curve 602 illustrates a portion below low-threshold 608, such as indicating needle 312 is within the target position, and optionally exiting via curve portion 602D indicating an increase in observed light when the light source associated, with curve 602, is energized.

Figure 7:
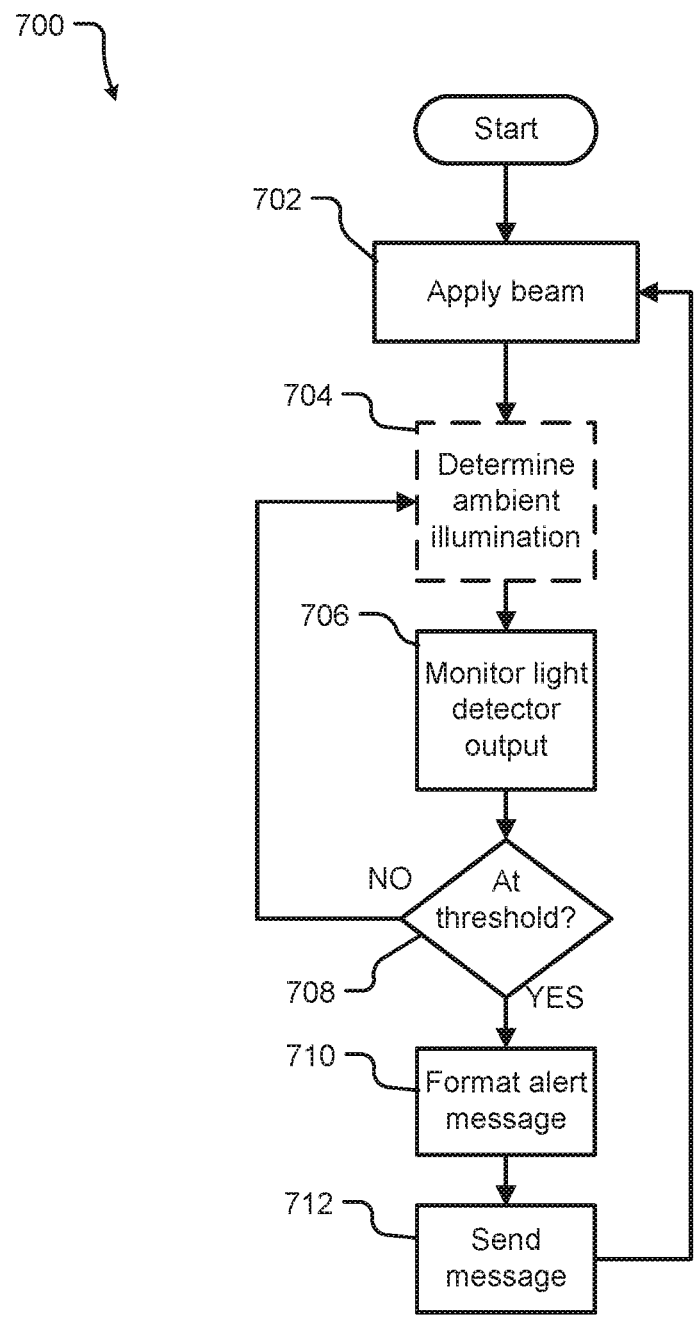
FIG. 7 illustrate a first process in accordance with embodiments of the present disclosure.

FIG. 7 illustrate process 700 in accordance with embodiments of the present disclosure. In one embodiment, process 700 is executed by a processor, such as processor 908 (see, FIG. 9) and beings with step 702 applying a beam to a target position of a dial, such as by energizing light emitter 106 positioned to illuminate a portion of a gauge, such as a portion of dial 112 of gauge 114 that is designated as the target position.

Step 704 is optionally executed to determine a baseline light level, such as a level of light detected by light detector 108 when needle 104 is outside of the target position. This may provide a level of light detected by light detector 108 comprising ambient light, light reflected from a cover of gauge 114, oil within gauge 114, and/or other sources of direct, reflected, and/or refracted light other than reflected from needle 104. Additionally or alternatively, the ambient light level may be observed with needle 104 within the target position and compared to when the observed light level increases (assuming needle 104 is configured to absorb the emitted light) indicating needle 104 has moved out of the target position, such as to determine a baseline of ambient light plus light reflected from needle 104 to then compare to when needle leaves the target position, and the observed light is absent reflected light from needle 104.

Step 706 monitors the output of a light detector, such as light detector 108. If the output of the light detector is compared to either a prior value and/or a baseline value, such as determined in step 704, to determine if needle 104 has entered or remains within the target position. Therefore, if test 708 indicates the light level is at (or beyond) a threshold, such as low-threshold 404, needle 104 is within the target position and test 708 is determined in the affirmative. If test 708 is determined in the negative, processing may continue to step 704 or, if omitted, step 706, to continue to monitor the output of the light detector. If test 708 is determined in the negative processing continues to step 710 whereby an alert message is formatted. In one embodiment, step 710 (alone or in conjunction with step 712) may be closing a circuit to energize a light, buzzer, or other alerting device. Additionally or alternatively, step 710 may format a message for conveyance on a network, such as an email, short messaging service (SMS), text message, generated speech telephony message, etc. For example step 710 may be generated that contains content that identifies the gauge, location of the gauge, value of the target position, and/or other information that may be useful, such as "Tuesday 3:35 PM, Gauge #123, steam pipe three, located in area 12—currently reading 450 degrees, condenser line may be blocked." The message may have headers or other addressing information applied and sent in step 712. Process 700 may then continue with application, or maintaining of the application, of the beam in step 702.

Additionally or alternatively, the processor executing process 700 may have a memory or access to a memory or other data storage comprising rules. For example, if needle 104 enters the target threshold, during a particular time (e.g., weekends) then format a text message to notify the on-call technician otherwise generate a voicemail message for delivery to an operations desk. Implementations of embodiments herein may be in combination, such that one gauge having a value indicated by needle 104 being within the target position and another factor (e.g., another gauge, time of day, value of another input, length of time the needle has remained in the target position, etc.) may be selected and executed. Multiple emitters may be implemented on the same gauge, such as to provide multiple notifications associated with multiple target positions. For example, one light emitter 106 may illuminate a low portion of gauge 114 and another light emitter 106 may illuminate a high portion of gauge 114. The positioning of multiple light detector 108, may then provide separate notifications when either the high or low value is indicated by needle 104.

Figure 8:
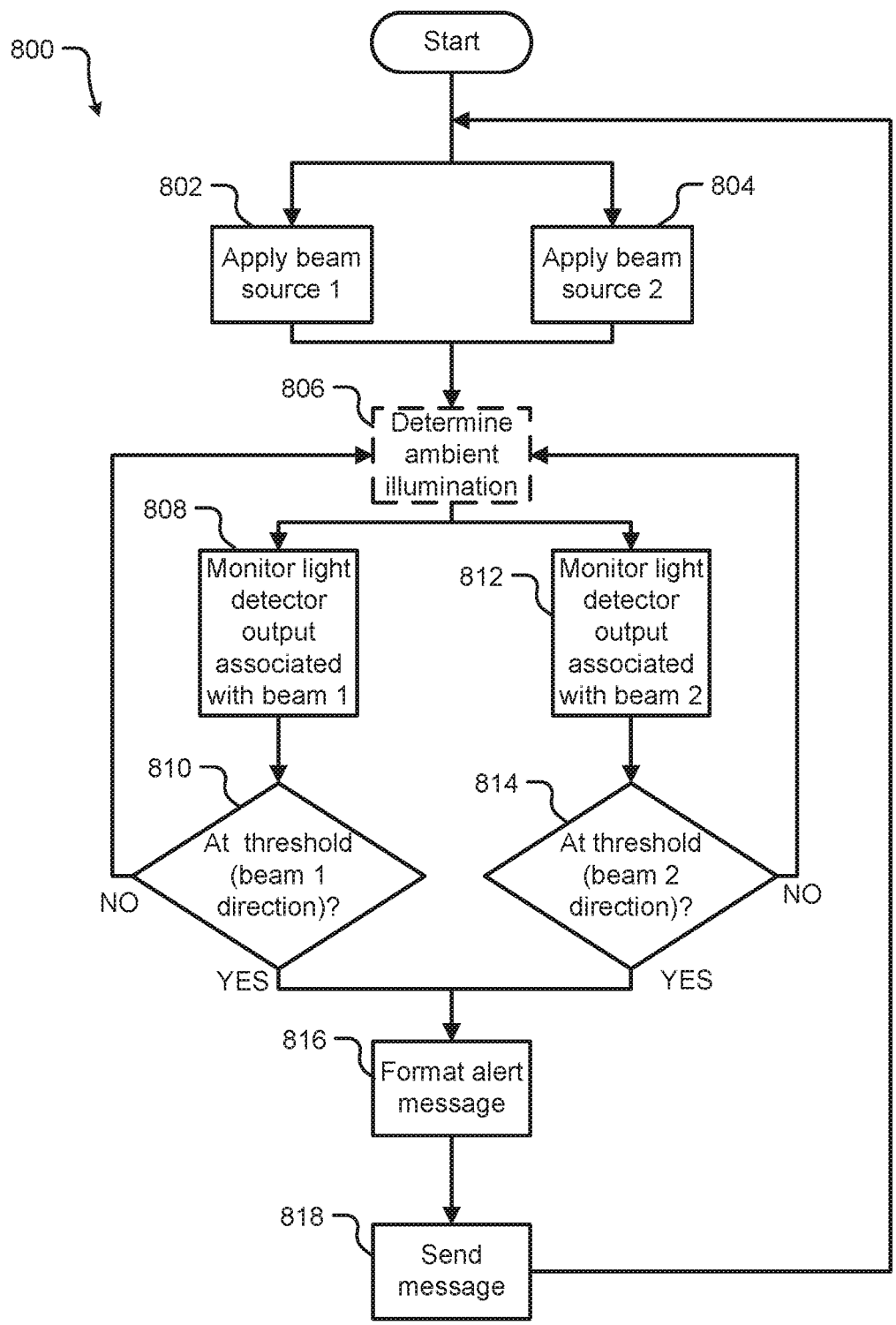
FIG. 8 illustrate a second process in accordance with embodiments of the present disclosure.

FIG. 8 illustrate process 800 in accordance with embodiments of the present disclosure. In one embodiment, process 800 is executed by a processor, such as processor 908 (see, FIG. 9) and beings with steps 802/804 applying a first and second beam to a first and second portion, respectively, of a target position of a dial, such as by energizing light emitters 302 and 304 to provide first beam 308 and second beam 310 of dial 112 of gauge 114 that is designated as portions of the target position. Step 802 may be executed simultaneously, such as when the resulting beams produce light that is differentiated by wavelength or polarization, or executed alternatively, such as when the resulting beams produce light that is differentiated by on-off cycle state such that the beams alternate and at no time are both beams produced simultaneously, or at least not while light detector 108 is observing and reporting.

Step 806 may be performed to determine a baseline light level. Step 806 is optionally executed to determine a baseline light level, such as a level of light detected by light detector 108 when needle 104 is outside of the target position, including portions of the target position that would be illuminated by either or both of the first beam 308 and second beam 310. This may provide a level of light detected by light detector 108 comprising ambient light, light reflected from a cover of gauge 114, oil within gauge 114, and/or other sources of direct, reflected, and/or refracted light other than reflected from needle 104. Additionally or alternatively, the ambient light level may be observed with needle 104 within the target position and compared to when the observed light level increases (assuming needle 104 is configured to absorb the emitted light) indicating needle 104 has moved out of the target position, such as to determine a baseline of ambient light plus light reflected from needle 104 to then compare to when needle leaves the target position, and the observed light is absent reflected light from needle 104.

Steps 808 and 812 monitor light detected by the first and second beam, respectively. The light detected by step 808 may be differentiated from the light detected in step 812 by wavelength, polarization, and/or on-off cycle state. Tests 810 and 814 determine if the observed light is at or above a threshold value. For example, test 810 when determined in the affirmative, indicates needle 312 is entering the target position from the direction of beam 1 (relative to the entirety of the target position). Test 814 when determined in the affirmative, indicates needle 312 is entering the target position from the direction of beam 2 (relative to the entirety of the target position). Tests 810, 814 may be executed continuously, independently, or alternatively. If both tests 810 and 814 are determined in the negative, processing may continue back to step 806, if implemented, or to steps 808 and 812 to continue monitoring the output of light detector 108.

If at least one of test 810 and test 814 are determined in the affirmative, process 800 continues to step 816 whereby a message is formatted for transmission in step 818. Step 816 may operate similarly to step 710 of FIG. 7. Additionally or alternatively, the message may indicate the direction (e.g., "rising," "dropping") associated with the determined direction that needle 312 is entering the target position.

Figure 9:
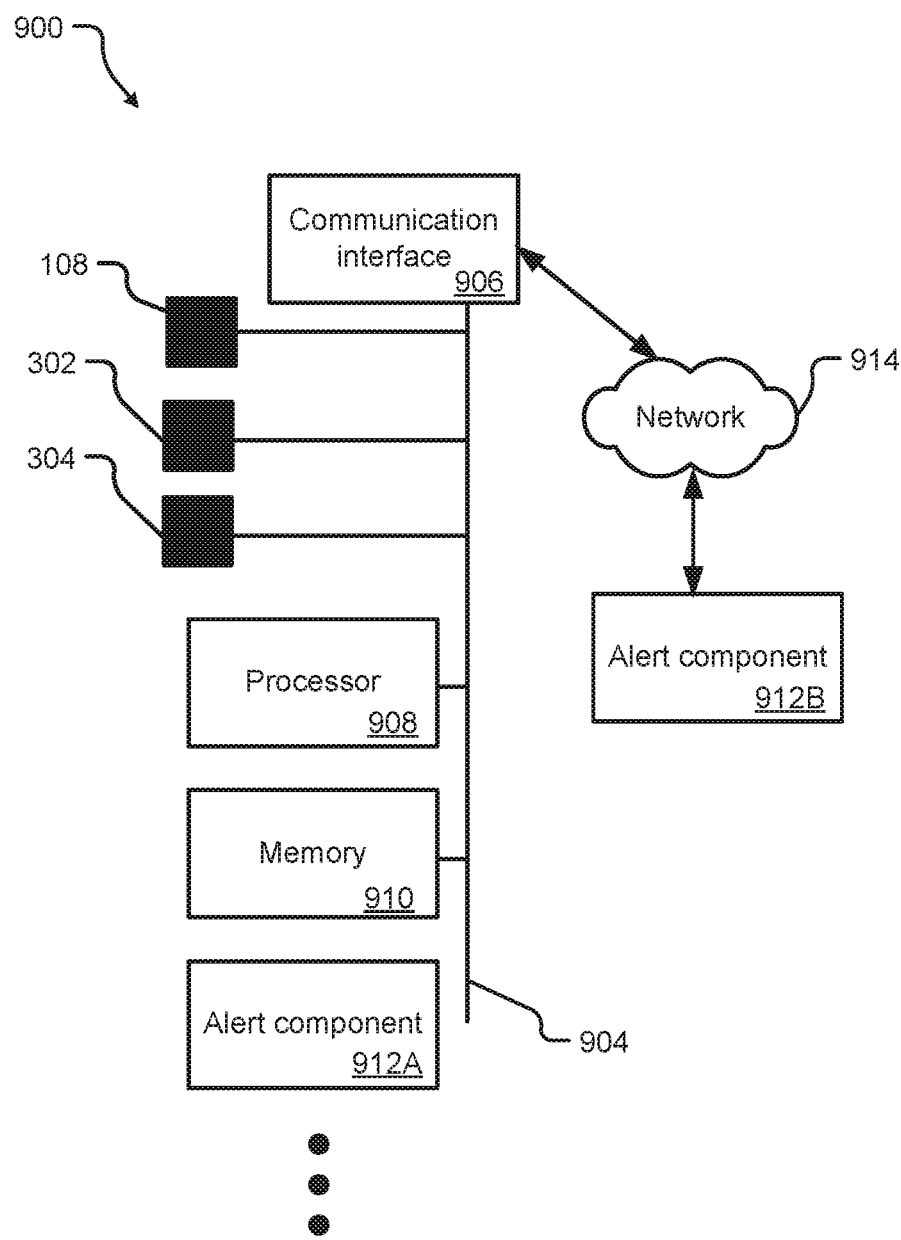
FIG. 9 illustrate a system in accordance with embodiments of the present disclosure.

FIG. 9 illustrate system 900 in accordance with embodiments of the present disclosure. In one embodiment, a first communications network 904, such as a first network, bus, inter-processor bus, trace, etc., enables a first set of components to communicate. Additionally or alternatively, a second communications network 914 may enable a second set of components to communicate, such as to communicate with alerting component 912B located externally to the first set of components, which may comprise two or more of communications interface 906, light detector 108, first light emitter 302, second light emitter 304, processor 908, memory 910, and alerting component 912A. Second communications network 914 may be embodied as a wired network (e.g., direct connection, Ethernet, plain old telephone system (POTS), etc.), wireless network (e.g., WiFi, cellular, Bluetooth, infrared, etc.), private network (e.g., LAN, WAN, etc.), public network (e.g., Internet), or other known data communications network or combinations thereof.

Alerting component 912 may receive a signal from processor 908 indicating that a target position of a needle on a gauge has been, or continues to be, met. Alerting component 912 may be a light, buzzer, telephone, computer, mobile device, third network, etc. Accordingly, if light detector 108 outputs a value of observed light to processor 908, which is then determined by processor 908 to indicate that the light output is associated with a needle of a gauge being within a target position, processor 908 may signal alerting component to alert accordingly.

Processor 908 may obtain rules from memory 910 and/or other data storage device such as to retrieve rules for particular message formats, who to address such messages, the content of such messages (which may further comprise content retrieved from memory 910 or other data storage), and modes of transmission (e.g., telephone, email, text, energized wire, etc.) and send the message. Processor 908 may selectively energize one or more of first light emitter 302 or second light emitter 304 and determine whether an output signal from light detector 108 is then associated with light emitted from one of first light emitter 302 or second light emitter 304 and format a message further indicating the direction the needle is entering the target position. Rules may also be implemented to cause processor 908 to delay response. For example, it may be of no concern that a needle is within the target position for less than an hour and, accordingly, when processor 908 receives signals from light detector 108 for an hour, then formats, or at least sends, the alert message to alert component 912.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate" and "compute," and variations thereof, as used herein, are used interchangeable and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

A number of variations and modifications of the invention can be used. It would be possible to provide for some features of the invention without providing others.

The present invention, in various embodiments, configurations, or aspects, includes components, methods, processes, systems and/or apparatus substantially as depicted and described herein, including various embodiments, configurations, aspects, subcombinations and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Description of the Invention for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Description of the Invention, with each claim standing on its own as a separate preferred embodiment of the invention.

Moreover, though the Description of the Invention has included a description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A device for detecting a presence of a needle being within a target position of a gauge, comprising:
   a first light emitter to emit a first beam to illuminate the target position on a dial of the gauge, the target position corresponding to a target value, within a range of the gauge, of a subject measured by the gauge;
   a light detector to detect the first beam and convert the detected first beam into an output signal;
   a processor to receive the output signal; and
   an output interface to output an alert, from the processor, to an alerting component; and
   wherein the processor receives the output signal and, upon determining that the subject being measured by the gauge is equivalent to the target value, said determining comprising determining that a value of the output signal is associated with the needle reflecting the first beam by being within the target position, causes the output interface to output the alert.

2. The device of claim 1, wherein the processor determines the value of the output signal is associated with the needle reflecting the first beam, by determining an ambient value of the output signal, as observed when the needle is known to be outside the target position, and wherein the value of the output signal and the ambient value of the output signal differ by at least a previously determined amount.

3. The device of claim 1, wherein the light detector utilizes a cylindrical lens to focus the first beam on to the target position.

4. The device of claim 1, wherein the first light emitter emits the first beam having a wavelength outside of a visible spectrum and the light detector detects the first beam having the wavelength outside the visible spectrum.

5. The device of claim 1, further comprising:
a second light emitter to emit a second beam to illuminate the target position on the dial of the gauge and wherein the first light emitter and the second light emitter illuminate a first portion of the target position and a second portion of the target position, respectively;
wherein the first beam differs from the second beam; and
wherein the processor, upon receiving the output signal associated with the needle reflecting the first beam and not the second beam, causes the alerting component to output the alert further comprising alerting that the needle is approaching a predefined threshold from a direction of the first portion of the target position.

6. The device of claim 5, wherein the first beam differs from the second beam in at least one of on-off cycle state, wavelength, or polarization.

7. The device of claim 6, wherein the light detector comprises a first light detector portion and a second light detector portion, each of the first light detector portion and the second light detector portion are sensitive to one of the first beam or the second beam, and providing the output signal is further associated with the detected first beam by at least one of the first light detector portion and the second light detector portion.

8. The device of claim 1, further comprising a network interface to convey the alert to a component on a network.

9. The device of claim 1, further comprising an alerting device to convey the alert to an observer of the gauge.

10. The device of claim 1, wherein the processor receives the output signal and, upon waiting a previously determined amount of time during which the output signal remains associated with the needle reflecting the first beam, outputting the alert.

11. A method for reading a needle position of a needle of a gauge, comprising:
illuminating a target position of a dial of the gauge with a first beam, the target position corresponding to a target value, within a range of the gauge, of a subject measured by the gauge;
receiving the first beam at a light detector and outputting a corresponding output signal associated with an attribute of the received first beam;
determining, by a processor receiving the output signal, that the subject being measured by the gauge is equivalent to the target value, said determining comprising determining that the output signal is associated with the needle reflecting the first beam by the needle being within the target position; and
in response, to determining that the needle is within the target position, outputting an alert to an alert receiving component.

12. The method of claim 11, wherein the attribute comprises one or more of intensity, wavelength, on-off cycle state, or polarization.

13. The method of claim 11, wherein the determining the output signal is associated with the needle reflecting the first beam comprises determining an ambient value of the output signal, as observed when the needle is known to be outside the target position, and wherein a value of the output signal and the ambient value of the output signal differ by at least a previously determined amount.

14. The method of claim 11, wherein the illuminating the target position of the dial comprises illuminating a cylindrical lens to focus the first beam on to the target position.

15. The method of claim 11, further comprising:
illuminating, with the first beam, a first portion of the target position;
illuminating, with a second beam, a second portion of the target position, wherein the first beam differs from the second beam; and
upon receiving the output signal associated with the needle reflecting the first beam and not the second beam, outputting the alert comprising notification that the needle is approaching a predefined threshold from a direction of the first portion of the target position.

16. The method of claim 11, wherein in response, the outputting the alert to the alert receiving component is delayed for a previously determined period of time during which the needle is determined to have remained within the target position.

17. A system for detecting a presence of a needle being within a target position of a gauge, comprising:
a first light emitter to emit a first beam to illuminate the target position on a dial of the gauge, the target position corresponding to a target value, within a range of the gauge, of a subject measured by the gauge;
a light detector to detect the first beam and convert the detected first beam into an output signal;
an output interface to produce an alert signal; and
a processor to receive the output signal; and
wherein the processor receives the output signal, determines that the subject being measured by the gauge is equivalent to the target value, said determining comprising determining that a value of the output signal is associated with the needle reflecting the first beam, and causes the output signal to output the alert signal to a component connected thereto.

18. The system of claim 17, further comprising:
a second light emitter to emit a second beam to illuminate the target position on the dial of the gauge, wherein the second light emitter emits the second beam differentiated from the first beam of the first light emitter;
wherein the first light emitter emits a first portion of the target position;
wherein the second light emitter emits a second portion of the target position; and
wherein the processor receives the output signal associated with the first beam emitted by the first light emitter, causes the output signal to output the alert signal comprising indicia of the needle approaching from the first portion of the target position.

19. The system of claim 18, wherein the first beam from the first light emitter and the second beam of the second light emitter are differentiated in response to control signals from the processor.

20. The system of claim 17, wherein the first light emitter emits the first beam differentiated from a second beam emitted by a second light emitter in at least one of intensity, wavelength, on-off cycle state, or polarization.

\* \* \* \* \*